United States Patent [19]

Martin

[11] Patent Number: 5,282,315
[45] Date of Patent: Feb. 1, 1994

[54] CABLE CUTTER APPARATUS

[76] Inventor: Kenneth E. Martin, Rte. 5 Box 165, King, N.C. 27021

[21] Appl. No.: 999,274

[22] Filed: Dec. 31, 1992

[51] Int. Cl.5 .................. B26B 13/00; B26B 13/26
[52] U.S. Cl. ................................. 30/251; 30/242
[58] Field of Search ............ 30/242, 244, 250, 251, 30/252, 273, 279; 169/9, 11, 71, 74, 81, 83

[56] References Cited

U.S. PATENT DOCUMENTS

| 472,304 | 4/1892 | Mann | 30/251 |
| 692,673 | 2/1902 | Joseph | 30/251 |
| 1,418,599 | 6/1922 | Mickels et al. | 30/242 |
| 1,476,049 | 12/1923 | Bush | 30/251 |
| 2,602,994 | 7/1952 | McGary et al. | 30/251 |
| 3,667,549 | 6/1972 | Sachs et al. | 169/74 |
| 4,775,012 | 10/1988 | Thompson et al. | 169/71 |

Primary Examiner—Richard K. Seidel
Assistant Examiner—Paul M. Heyrana
Attorney, Agent, or Firm—Leon Gilden

[57] ABSTRACT

A cable cutter mounted within an elongate tubular housing includes cutter blades at a first end of the housing and operative handles at the second end of the housing to permit access to restricted areas such as in motor vehicles and the like.

2 Claims, 4 Drawing Sheets

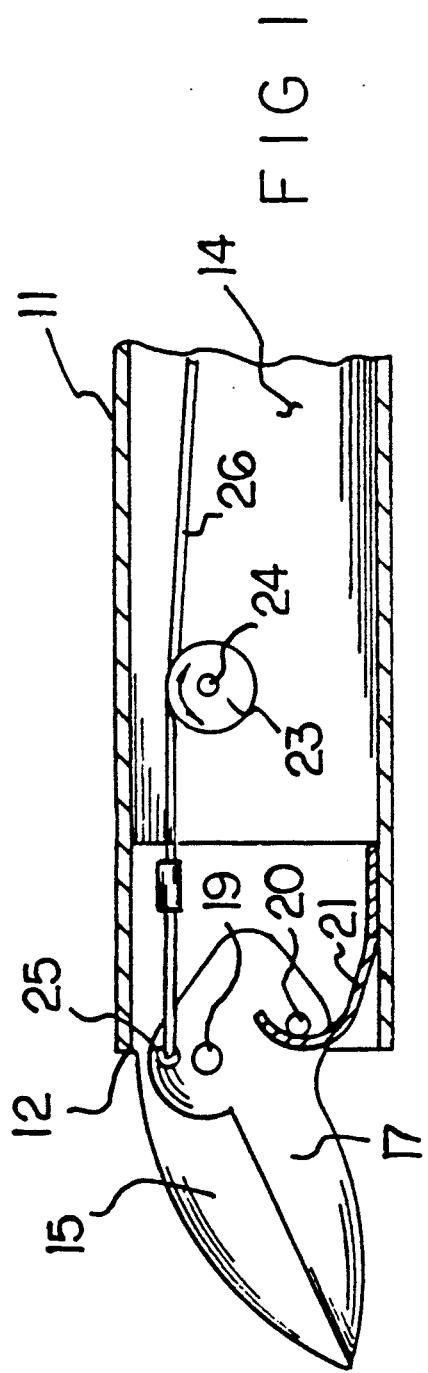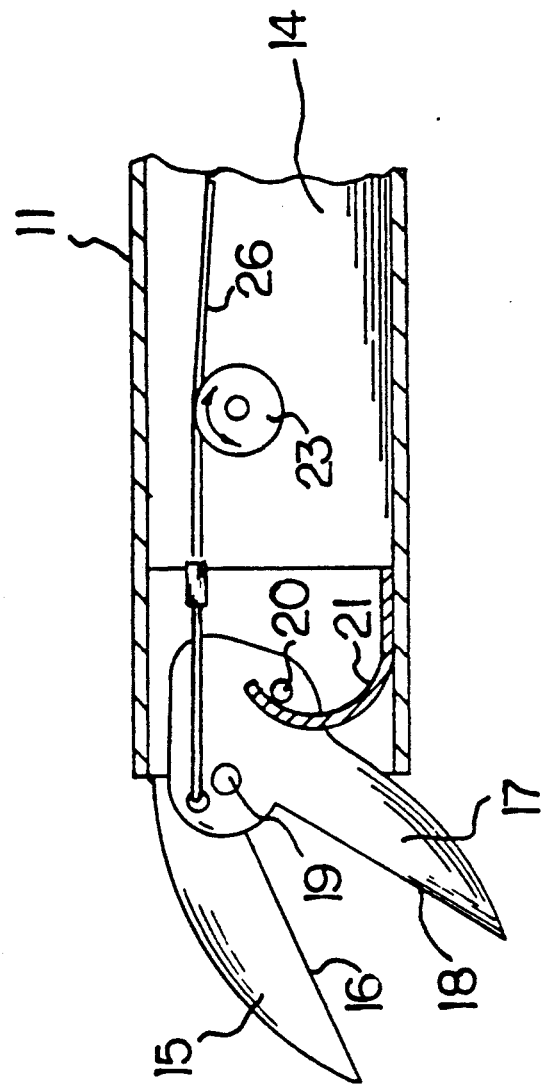

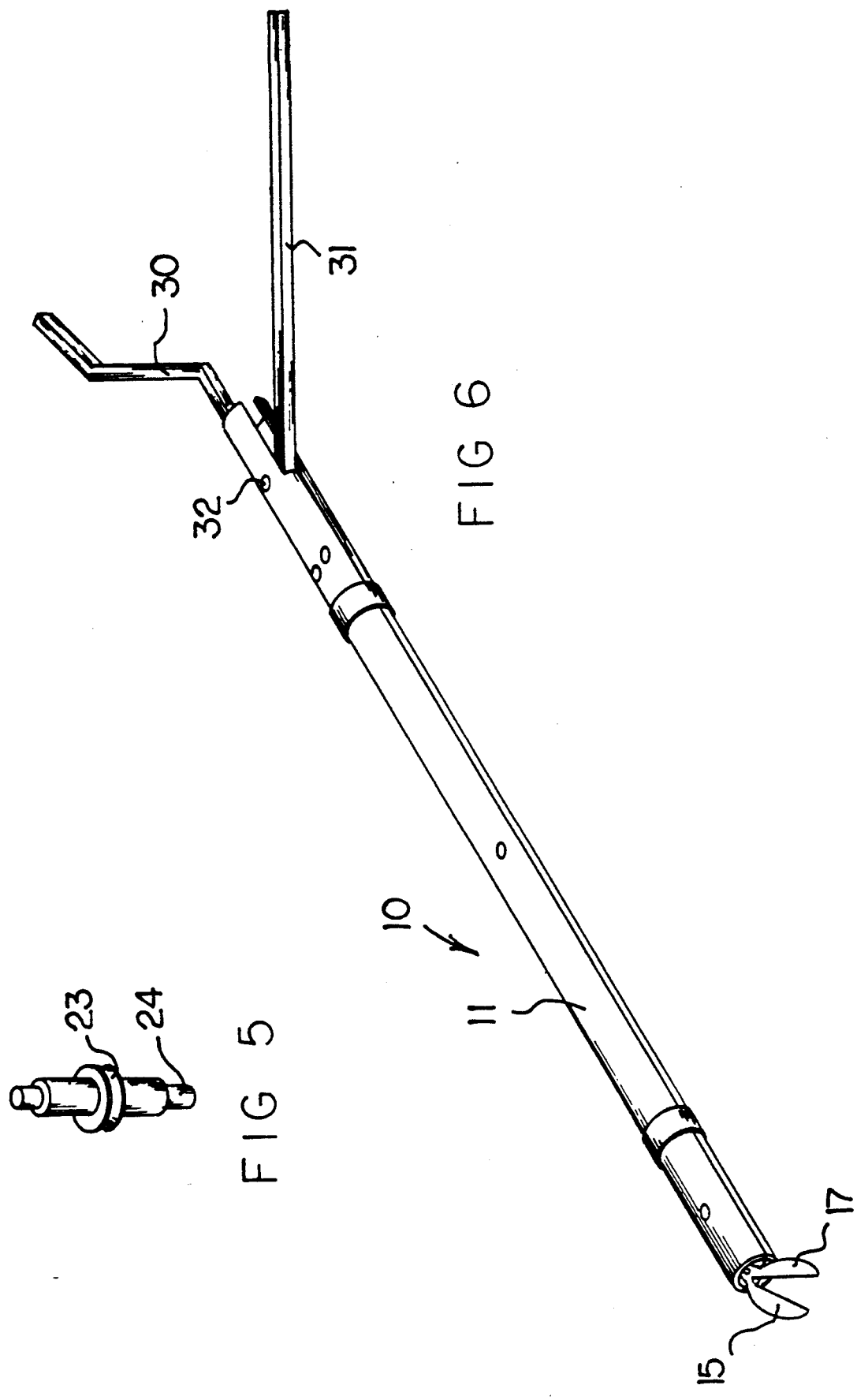

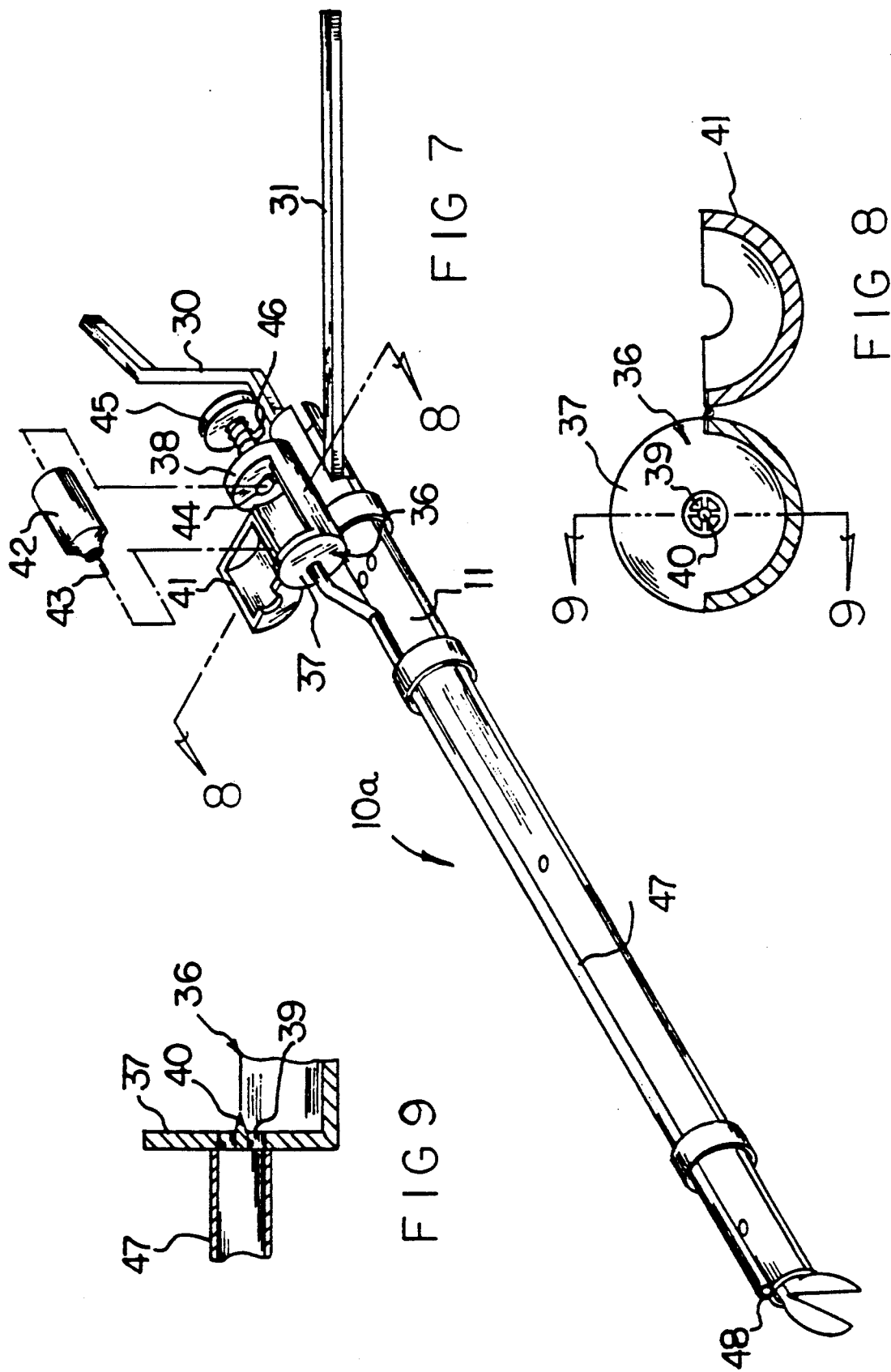

CABLE CUTTER APPARATUS

BACKGROUND OF THE INVENTION

1. Field of the Invention

The field of invention relates to cutting tools, and more particularly pertains to a new and improved cable cutter apparatus wherein the same may be inserted through limited openings to sever cables such as battery cables for use by emergency personnel.

2. Description of the Prior Art

Prior art structure is indicated by the U.S. Pat. Nos. 4,178,682; 4,524,549; 4,639,576; 4,558,584; and 4,779,342.

Subsequent to and coincident with accident, vehicular batteries, and more particularly their cables, must be severed inasmuch as short circuits, spilled fuel, and the like provides for accidental explosion, wherein the instant invention attempts to overcome deficiencies of the prior art by providing for a cable cutting structure of an elongate narrow construction to permit the severing of cables within confined quarters such as in motor vehicles and in this respect, the present invention substantially fulfills this need.

SUMMARY OF THE INVENTION

In view of the foregoing disadvantages inherent in the known types of cable cutter apparatus now present in the prior art, the present invention provides a cable cutter apparatus wherein the same is mounted within an elongate tubular housing to permit remote cutting and access to confined quarters. As such, the general purpose of the present invention, which will be described subsequently in greater detail, is to provide a new and improved cable cutter apparatus which has all the advantages of the prior art cable cutter apparatus and none of the disadvantages.

To attain this, the present invention provides a cable cutter mounted within an elongate tubular housing including cutter blades at a first end of the housing and operative handles at the second end of the housing to permit access to restricted areas such as in motor vehicles and the like.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cable cutter apparatus which has all the advantages of the prior art cable cutter apparatus and none of the disadvantages.

It is another object of the present invention to provide a new and improved cable cutter apparatus which may be easily and efficiently manufactured and marketed.

It is a further object of the present invention to provide a new and improved cable cutter apparatus which is of a durable and reliable construction.

An even further object of the present invention is to provide a new and improved cable cutter apparatus which is susceptible of a low cost of manufacture with regard to both materials and labor, and which accordingly is then susceptible of low prices of sale to the consuming public, thereby making such cable cutter apparatus economically available to the buying public.

Still yet another object of the present invention is to provide a new and improved cable cutter apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic cross-sectional illustration of the cutter structure in a first position.

FIG. 2 is an orthographic cross-sectional illustration of the structure in a second position.

FIG. 5 is an isometric illustration of pulley structure employed by the invention.

FIG. 6 is an isometric illustration of the invention.

FIG. 7 is an isometric illustration of a modified aspect of the invention.

FIG. 8 is an orthographic view, taken along the lines 8—8 of FIG. 7 in the direction indicated by the arrows.

FIG. 9 is an orthographic view, taken along the lines 9—9 of FIG. 8 in the direction indicated by the arrows.

DESCRIPTION OF THE PREFERRED EMBODIMENT

Figures 3, 4:
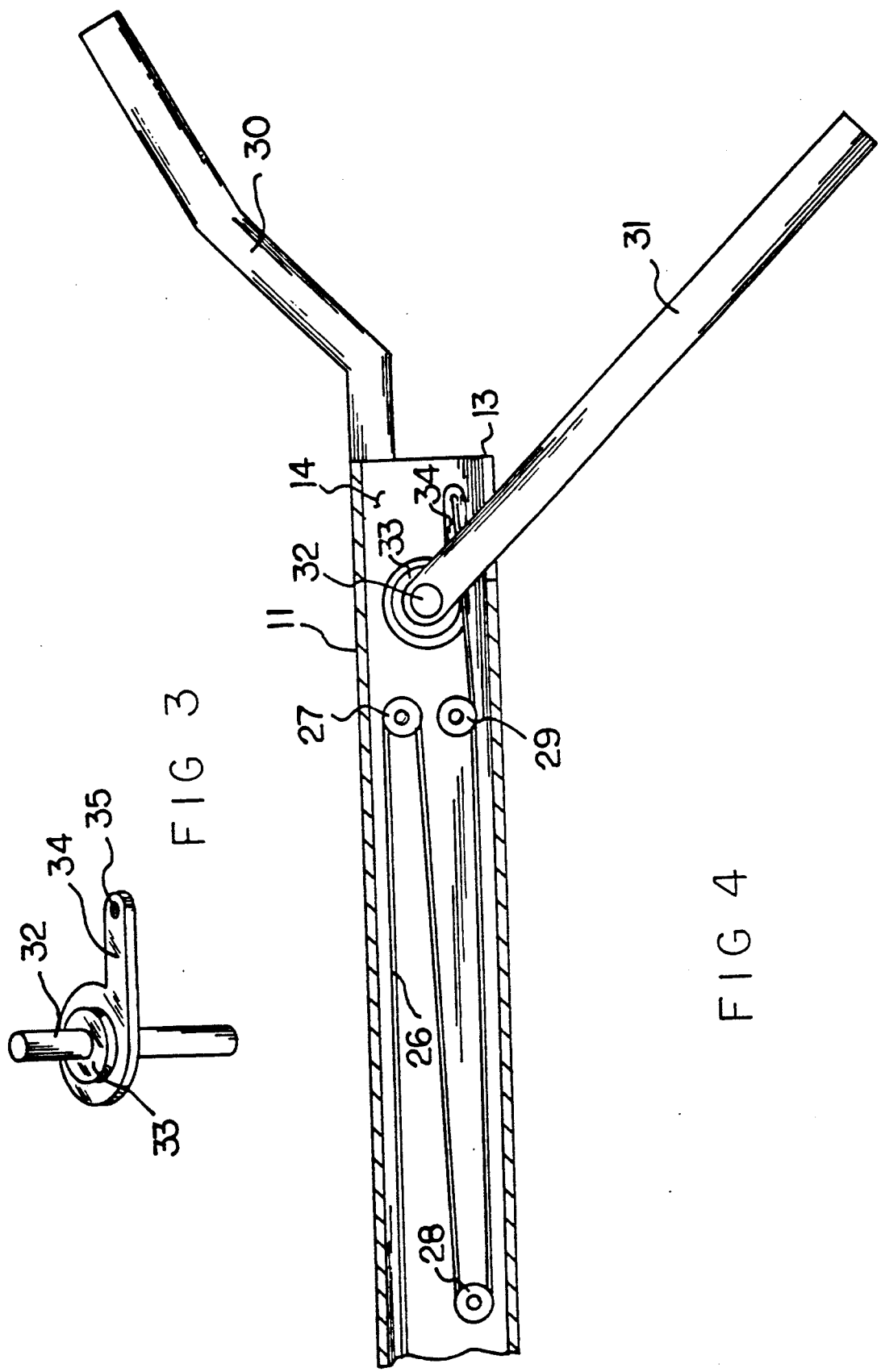
FIG. 3 is an isometric illustration of the use of a handle pulley and associated actuator link structure.
FIG. 4 is an orthographic cross-sectional illustration of the second end portion of the tubular housing structure.

With reference now to the drawings, and in particular to FIGS. 1 to 9 thereof, a new and improved cable cutter apparatus embodying the principles and concepts of the present invention and generally designated by the reference numerals 10 and 10a will be described.

More specifically, the cable cutter apparatus 10 of the instant invention essentially comprises an elongate tubular housing 11, having a first end 12 spaced from a second end 13, with an elongate housing cavity 14 coextensive relative to the housing extending from the first end 12 to the second end 13. A fixed jaw 15 is fixedly mounted to the first end, having a fixed jaw cutting edge 16, with the fixed jaw 15 cooperative with a pivoted jaw 17. It should be noted that the fixed jaw and the pivoted jaw 15 and 17 respectively when in a first position and engage relative to one another are of a predetermined height not to exceed a predetermined diameter of the housing 11 to permit ease of access of the organization within a limited working environment. The pivoted jaw 17 includes a pivoted jaw cutting edge 18, with the pivoted jaw 17 pivotally mounted about a pivot jaw axle 19. The pivoted jaw 17 further includes a lug 20 received within biased engagement relative to an arcuate spring 21 mounted within the cavity 14 adjacent the first end 12 to bias the pivoted jaw 17 into engagement with the fixed jaw 15.

A first pulley 23 is provided in adjacency to the first end 12 rotatable about a first pulley axle 24. A pivoted jaw aperture 25 is directed through the pivoted jaw in adjacency to the pivoted jaw axle 19, wherein an actuator cable 26 has its first end mounted to the pivoted jaw aperture 25 and directed about a second cable 27 positioned in adjacency to the second end 13. Subsequently, the actuator cable 26 is directed about a third pulley 28 oriented between the second pulley 27 and the first pulley 23, and thereafter the actuator cable 26 is wound about a fourth cable 29 positioned in adjacency to the first end of 12 of the housing 11. In this manner, the cable 26 is directed from a first side of the housing 11 to a diametrically opposed side of the housing 11 when directed through the housing from the first end 12 to the second end 13. A fixed handle 30 is mounted to the second end 13 in adjacency to the second cable 27, with a pivoted handle 31 pivoted about a pivoted handle axle 32 that is positioned medially of the second and third pulleys 27 and 28 between the second and third pulleys and the second end 13. The pivoted handle includes a pivoted handle pulley 23 concentrically oriented about the pivoted handle axle 32, with a link plate 34 extending radially from the pivoted handle pulley 33 towards the second end 13. The link plate 34 includes a link plate cable attachment aperture 35 receiving a second end of the actuator cable 26, whereupon rotation of the pivoted handle relative to the fixed handle, the link plate 34 is pivoted thereby tensioning the cable 26 to effect projection of the pivoted jaw towards the fixed jaw for a severing procedure.

The apparatus 10a, as indicated in FIG. 7, includes a container receiving shell 36 positioned to an interior surface of the housing 11 in adjacency to the second end, with a receiving shell 36 having a first wall 37 spaced from a second wall 38 in a parallel relationship, with the first wall having a first wall exit port 39 coaxially directed through the first wall, with a puncture spike 40 oriented medially of the exit port projecting interiorly of the shell 36 coaxially aligned relative to the first wall and the second wall 37 and 38. A shell lid 41 is pivotally and hingedly mounted relative to the receiving shell 36. A halon gas canister 42 is positioned within the receiving shell 36, with the canister 42 having a sealed neck opening 43 aligned with the spike 40. A plunger 44 is reciprocatably directed through the second wall 38, with a plunger head 35 mounted to the plunger 44 exteriorly of the shell 36, with a spring interposed between the second wall 38 and the plunger head 45. Manual projection of the plunger head 45 towards the second wall 38 effects projection of the canister 42, and more specifically, the neck opening 43 to receive the spike 40 to puncture the canister 42 and direct halon gas through the exit port 39 and a conduit tube 47. The conduit tube 47 is in pneumatic communication with the halon gas canister 42 through the exit port 39, with a conduit tube exit opening 48 positioned and mounted fixedly to the housing 11 in adjacency to the first end 12 to direct halon gas through the exit opening 48 for extinguishing of fire that may have commenced within an emergency situation.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cable cutter apparatus, comprising,
   an elongate tubular housing, having a first end spaced from a second end, wherein the housing is coaxially aligned and includes a housing cavity coextensive through the housing from the first end to the second end, and
   a fixed jaw fixedly mounted to the tubular housing at the first end, with the fixed jaw having a cutting edge, and a pivoted jaw pivotally mounted about an axle, the axle directed through the housing adjacent the first end, wherein the pivot jaw includes a pivot jaw cutting edge cooperative with the fixed jaw cutting edge and in contiguous communication with the fixed jaw cutting edge in a first position, and spaced from the fixed jaw cutting edge in a second position, and
   actuator means mounted to the pivoted jaw and extending through the cavity for displacing the pivoted jaw from the first position to the second position, and the pivot jaw includes a lug fixedly mounted to the pivoted jaw parallel to the axle, and an arcuate spring mounted within the cavity adjacent the first end, wherein the lug is arranged for contiguous communication with the arcuate spring biasing the pivoted jaw cutting edge in the first position, and the actuator means includes a pivoted jaw aperture directed through the pivoted jaw in adjacency to the axle, and an actuator cable, the actuator cable having a first end mounted to the pivoted jaw aperture, and a first pulley mounted within the cavity in adjacency to the pivoted jaw, with the actuator cable directed about the first pulley, and a second pulley mounted within the cavity in adjacency to the second end, with the actuator cable wound about the second pulley, and a third pulley mounted within the cavity between the second pulley and the first pulley, and a fourth pulley positioned in adjacency to the second pulley, wherein the actuator cable is directed about the third pulley and the fourth pulley, and a fixed handle mounted to the tubular housing adjacent the second end, and a pivoted handle having a pivoted handle axle, wherein the axle is directed through the cavity adjacent the second end, with the pivoted handle axle including a pivoted handle pulley concentrically fixed about the axle, and the actuator cable directed about the pivoted handle pulley, and a link plate fixedly mounted to the pivoted handle axle projecting beyond the pivoted handle pulley, the actuator cable having an actuator cable second end, and the actuator cable second end mounted to the link plate spaced from the pivoted handle axle, whereupon pivoting of the pivot handle effects displacement of the fixed jaw from the second position to the first position, and a container receiving shell mounted to the tubular housing in adjacency to the second end, with the shell having a first wall spaced from a second wall, and the first wall having a first wall exit port, and a puncture spike mounted coaxially of the exit port and oriented between the first wall and the second wall, and a halon gas canister mounted within the shell, having a neck opening positioned in alignment with the spike, and a plunger reciprocatably mounted through the second wall, the plunger having a plunger head positioned exteriorly of the receiving shell, and a spring interposed between the second wall and the head, whereupon projecting of the plunger towards the first wall from the second wall effects projection of the canister and puncturing of the neck opening to direct gas through the exit port.

2. An apparatus as set forth in claim 1 including a conduit tube, the conduit tube in pneumatic communication with the first wall exit port, with the conduit tube directed along the tubular housing exteriorly of the tubular housing and having its conduit tube exit port positioned in adjacency to the first end to direct halon gas from said halon gas canister in adjacency to the fixed jaw and the pivoted jaw.

* * * * *